Patented Mar. 19, 1946

2,396,793

UNITED STATES PATENT OFFICE 2,396,793

SCRAP METAL RECOVERY PROCESS

William J. Kroll, Niagara Falls, N. Y.

No Drawing. Application March 22, 1944,
Serial No. 527,667

9 Claims. (Cl. 75—82)

This invention relates to a scrap metal recovery process and more particularly to a method of treating scrap or impure nickel to purify the same by eliminating therefrom substantially all associated metal impurities.

One of the objects of the invention is to provide a simple and effective proces for the treatment of scrap or impure nickel to recover the nickel content thereof in a substantially pure condition.

Another object is to provide a method of removing contaminating metals such as Cu, Co, Fe, Cr, Zn, Al and Mn, substantially completely from scrap and impure nickel.

Other objects will be apparent as the invention is more fully hereinafter disclosed.

In accordance with the above objects I have discovered that when scrap or impure nickel in its finely divided or comminuted condition and while in suspension in a molten metal chloride bath consisting of the chloride compounds of metals relatively high in the displacement series of metals in the system solid metal-molten metal chloride, is subjected to the action of free chlorine, most of the metallic impurities contained in the scrap nickel are converted into chloride compounds and dissolved into the molten metal chloride bath before the nickel is substantially converted to metal chloride, and that by a careful control over the chloridizing action a metallic residue consisting of substantially pure nickel may be obtained.

In the practice of this invention, the basic reaction involved is substantially the same as that disclosed in my copending application Serial No. 527,665 filed March 22, 1944, entitled Refining nickel, and is predicated upon the discovery that in the displacement series of metals in the system solid metal-molten metal chloride within the temperature range 500–1000° C., nickel, contrary to expectations, is relatively low in the said series and, in fact, is lower than all of the metals commonly associated therewith in nickel alloys. The order of the metals in the displacement series is substantially that given above, namely, (in ascending order) the following sequence: Ni, Cu, Co, Fe, Cr, Zn, Al and Mn.

Most of the metals not included in this list also lie above Ni in the displacement series, there being only a few metals such as platinum group metals, gold, tungsten, molybdenum, arsenic and bismuth which are lower than Ni in this displacement series. Certain intermetallic compounds such as the metal silicide compounds have positions in this list different from the metal comprising the same.

This position of nickel in the displacement series allows the selective chlorination of the scrap or impure nickel under conditions providing for the solution removal of the chloride compounds as rapidly as formed and under conditions permitting rapid diffusion of the associated metal impurities to the surface of the nickel for chlorination.

This condition is obtained by reducing the particle size of the scrap or impure nickel to as small a particle size as is economically practical and at least to a size passing 60 to 100 mesh thereby to reduce the path of diffusion of alloyed constituents to the surface of each metal particle to a relatively low order, and chloridizing the metal particles while suspended in a molten metal chloride bath having a high solubility for, or diffusion rate for, the metal chloride compounds being formed, the temperature of the bath during chlorination being maintained substantially above the melting point of the highest melting metal chloride being formed.

Alternatively, where the scrap metal consists of relatively thin sectioned turnings, chips, etc., the scrap material need only be broken into fragments of a size convenient to handle in accordance with the present invention.

Practically all of these conditions are met in a fusion mixture consisting of highly stable chlorides such as the alkali and alkaline earth metals, mixed in such proportions as to provide a bath that is molten throughout the range 500–1000° C. The preferred mixture consists of a 60/40 mixture of potassium and sodium chlorides. This fusion mixture dissolves or is miscible with relatively large quantities of metal chloride compounds and protects the same from oxidation reaction and suppresses volatilization of the chloride compounds over this wide range of temperatures.

In accordance with the present invention, accordingly, I preferably reduce the particle size of the scrap or impure nickel by any convenient means such as by mechanical means involving grinding, milling, pulverizing, etc., to a particle size passing at least 60 to 100 mesh. In most instances, where the character of the material permits, I prefer to reduce the particle size to below 200 mesh.

The small particle sized material is suspended or dispersed in a molten bath consisting of a 60/40 mixture of KCl and NaCl, the relative proportions of metal powder to fusion mixture being widely variable without essential departure from the invention. In general, the relative amount of the two materials is such as to provide a freely liquid fusion at a temperature within the range 500–1000° C.

I then pass gaseous chlorine into the molten fusion at a relatively slow rate consistent with an economically practical time interval for accomplishing the chlorination of all associated metal impurities. In the practice of this step of the process an excessively fast rate of chlorination is undesired as relatively large amounts of nickel chloride will be formed where the rate of chlorination is in excess of the rate of diffusion of the alloy impurities to the surface of each particle. However, a simple control of this chlorination process may be practiced. This consists essentially in an intermittent passage of the chlorine into the fusion mixture. First passing the chlorine into the fusion until the bath contains a substantial amount of nickel chloride and interrupting the passage of the chlorine until the nickel chloride disappears from the bath and repeating this sequence until nickel chloride in substantial amounts is retained in the bath.

The disappearance of the nickel chloride from the bath is due to the reverse reaction whereby one of the metals above Ni in the displacement series enters solution and displaces the nickel of the nickel chloride present in the fusion in accordance with the general reaction—

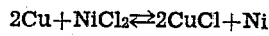

This reaction is similar with all metals lying above Ni in the series and at temperatures within the range 500–1000° C. the direction of the reaction is to the right.

Accordingly, by allowing this displacement reaction to occur intermittently with the chlorinating reaction, a final chlorination result which consists of a bath substantially free of nickel chloride and a suspended metal product consisting of substantially pure nickel may be obtained, with proper careful operation.

Alternatively, and to avoid the use of a large excess of chlorine the rate of flow of chlorine into the bath may be proportioned relative to the rate of chlorination of the metals to accomplish substantially the same ultimate result.

In general, however, there usually results a metal chloride fusion containing substantial amounts of nickel chloride which, when separated from the suspended substantially pure nickel metal powder, may be treated in accordance with the invention of my co-pending application Serial No. 527,665 filed March 22, 1944, entitled Refining nickel for the selective separation therefrom of the various metallic constituents present therein. Alternatively, the chloride fusion mixture resulting may be treated in accordance with prior art methods, wet and electrolytic, to recover the contained metal chlorides, if desired.

The above method is applicable to the treatment of impure nickel metal powder produced by the reduction of mixed metal oxides or to scrap material consisting of nickel base alloys of all types, and in its application is adapted to produce, as a refined metal product, substantially pure nickel powder which on melting and casting is adapted for wide use in the art of making nickel base alloys.

As a modification of the present invention, I have discovered that when the chlorination is practiced in the presence of copper, chromium or iron chlorides, the rate of chlorination of the metal particles is greatly accelerated due to the fact that these chlorides are solvents for chlorine, converting molecular chlorine into ionic chlorine which is of higher chemical activity than molecular chlorine. In the chloridizing of nickel base alloys containing Cu, Fe and Cr, this condition ultimately is attained but I have found it highly advantageous to incorporate initially in the alkali metal chloride fusion mixture from 5 to 25% of the chloride compound of one of the multivalent metals Cu, Fe and Cr. The reaction involved in this improvement feature can be most simply illustrated in the following equations:—

(1) $CuCl + Cl = CuCl_2$
(2) $CuCl_2 + Ni = Cu + NiCl_2$
(3) $NiCl_2 + Cu = CuCl + Ni$
(4) $CuCl_2 + Cu = 2CuCl$

From these Equations 1 to 4 it may be seen that when chlorine is passed into a molten bath consisting of alkali metal chlorides and some cuprous chloride (CuCl) the first reaction is to form the higher valency cupric chloride compound $CuCl_2$. This compound, being essentially unstable at temperatures within the range 500–1000° C., is highly reactive with any metal present, such as nickel, reacting therewith as in Equation 2. In the presence of metallic copper, however, nickel chloride is reduced with formation of CuCl which, in the presence of free chlorine, reacts to form more of the higher chloride ($CuCl_2$) which in the presence of metallic copper is ultimately reduced to CuCl as indicated in Equation 4.

Iron chloride and chromium chloride react substantially in the same way as above noted with copper chloride in Equations 1 to 4 inclusive. Ferrous chloride first being chlorinated to $FeCl_3$ which is reduced by any metal present to $FeCl_2$ and again chlorinated to $FeCl_3$. Chromium chloride in the presence of free chlorine is chlorinated to $CrCl_3$ which is reduced to $CrCl_2$ by metal and rechlorinated to $CrCl_3$.

It is believed apparent that relatively small amounts of the lower chloride compounds of Cu, Fe and Cr, would be highly effective as chlorinating agents in a molten bath consisting of stable chlorides such as the alkali and alkaline earth metal chlorides in the chloridizing treatment of comminuted metallic nickel, and that by use of such compounds the chloridizing extraction of metallic impurities from the comminuted nickel would be greatly accelerated, particularly in the early stages of the chloridizing extraction.

Various modifications of the present invention are available to one skilled in the art. As an example, where it is not necessarily desired to obtain from scrap nickel-copper alloys a residue metal consisting of substantially pure nickel, the chlorinating reaction may be selectively practiced until only nickel and copper remain in the metallic residue; similarly where the metal being processed consists of scrap nickel-chromium or nickel-cobalt or nickel-iron alloys, the chlorinating reaction may be conducted so as to selectively leave behind in the residue all metals below Co, Fe or Cr, in the displacement series, as the case may be.

It is believed apparent that the present invention, as a major advantage, affords a means of isolating from the scrap nickel the associated impurities as chloride compounds concentrated in the molten bath for recovery therefrom by known chemical or electro-chemical processes.

Various other modifications and adaptations of the present invention may occur to those skilled in the art and all such are contemplated as may fall within the scope of the following claims:

What I claim is:

1. The method of treating nickel and nickel alloys to remove therefrom associated metal impurities which comprises comminuting the metal, suspending the comminuted metal in a molten metal chloride fusion consisting principally of the chloride compound of a metal relatively high in the displacement series of metals in the system solid metal-molten metal chloride and passing gaseous chlorine into and through the said fusion at a relatively slow rate while maintaining a temperature therein within the range 500–1000° C. until the associated metal impurities have been substantially completely converted into metal chloride compounds and dispersed throughout the molten metal chloride fusion and the bath retains on standing without chlorination a small amount of nickel chloride.

2. The method of treating impure nickel to purify the same which comprises reducing the particle size of the nickel to a relatively small size, suspending the same in a molten bath consisting of the chloride compounds of metals high in the displacement series of metals in the system solid metal-molten metal chloride, and passing chlorine into the fusion mix at a relatively slow rate while maintaining a temperature within the range 500–1000° C. until the desired percentage of the impurity present in the said nickel has been removed and collected in the bath as metal chloride compounds.

3. The method of treating nickel-copper alloys to remove the copper therefrom which comprises reducing the particle size of the alloy to relatively small size, suspending the same in a fusion mixture consisting of alkali metal chlorides having a liquid phase within the range 500–1000° C., and passing chlorine into the said fusion mixture at a relatively slow rate while maintaining said liquid phase until the copper content of the said alloy has been removed to the extent desired as copper chloride and collected in the said bath.

4. The method of removing the metals Cu, Co, Fe, Cr, Mn, Zn and Al, from nickel which comprises comminuting the nickel, suspending the comminuted nickel in a fusion mixture consisting of a mixture of KCl and NaCl having a liquid phase within the range 500–1000° C., and passing chlorine into the said fusion mixture at a relatively slow rate while maintaining the same in its said liquid phase for a time interval effective to remove the said metals from the said nickel as metal chloride compounds dispersed in said fusion mixture.

5. The method of claim 4, wherein chloridizing is terminated prior to substantially complete removal of said metals to effect a selective separation of the same in accordance with the descending order of the metals in the displacement series of metals in the system solid metal-molten metal chloride within the temperature range 500–1000° C.

6. The method of claim 1, wherein a proportion of a metal chloride compound of a multivalent metal is added to the said molten metal chloride fusion.

7. The method of claim 1, wherein a proportion of the chloride compound of one of the metals Fe, Cu and Cr is added to the said molten metal chloride fusion.

8. The method of claim 1, wherein a proportion of copper chloride is added to the said molten metal chloride fusion.

9. The method of claim 1, wherein the said chlorine is fed into the bath intermittently and repeatedly until the chloride fusion retains nickel chloride.

WILLIAM J. KROLL.